(12) United States Patent
Lee et al.

(10) Patent No.: US 8,576,556 B2
(45) Date of Patent: Nov. 5, 2013

(54) ELECTRONIC BOOK DEVICE INTEGRATED WITH A MAGNETIC PEN RACK

(75) Inventors: Cheng-Hao Lee, Taipei (TW); Wei-Lin Hsieh, New Taipei (TW)

(73) Assignee: E Ink Holdings Inc., Hsinchu (TW)

( * ) Notice: Subject to any disclaimer, the term of this patent is extended or adjusted under 35 U.S.C. 154(b) by 170 days.

(21) Appl. No.: 13/353,681

(22) Filed: Jan. 19, 2012

(65) Prior Publication Data
US 2012/0243174 A1    Sep. 27, 2012

(30) Foreign Application Priority Data
Mar. 22, 2011 (TW) .............................. 100109655 A

(51) Int. Cl.
*G06F 1/16* (2006.01)
(52) U.S. Cl.
USPC ... 361/679.27; 362/607; 348/725; 248/316.1; 439/460
(58) Field of Classification Search
USPC ................... 362/253, 621, 97.1, 607, 296.01, 362/311.01, 602, 619; 348/14.08, 158, 731, 348/725, 836, 14.01; 248/551, 122.1, 248/316.1, 450, 464, 461, 462, 688; 361/679.21, 679.4, 679.56, 679.41, 361/679.49, 679.09, 679.27, 679.55, 361/679.02, 679.08, 679.32, 679.01, 361/679.31, 679.6, 679.17, 679.48, 679.33; 439/38, 39, 133, 331, 350, 460, 391, 439/131; 345/158, 179, 107, 76, 589, 173, 345/211, 214, 690
See application file for complete search history.

(56) References Cited

U.S. PATENT DOCUMENTS

| | | | | |
|---|---|---|---|---|
| 5,947,304 | A * | 9/1999 | Thorp | 211/69.5 |
| 6,722,891 | B1 * | 4/2004 | Ma | 434/409 |
| 8,246,208 | B2 * | 8/2012 | Huang et al. | 362/253 |

* cited by examiner

*Primary Examiner* — Hung Duong
(74) *Attorney, Agent, or Firm* — Guice Patents PLLC

(57) ABSTRACT

An electronic book device integrated with a magnetic pen rack, including a leather cover, a rack, a magnetic pen, a LED light source module, and an electronic book. The rack, of rectangular outline and having an opening at one side, is fixed on the leather cover so as to form a rectangular space for accommodating the electronic book. The rack includes: at least one bolt, used for fixing the electronic book; a first groove, used for accommodating the magnetic pen, the first groove having a first metal contact part for electrically connecting the magnetic pen with the electronic book; and a second groove, used for accommodating the LED light source module, the second groove having a second metal contact part for electrically connecting the LED light source module with the electronic book.

10 Claims, 3 Drawing Sheets

ELECTRONIC BOOK DEVICE INTEGRATED WITH A MAGNETIC PEN RACK

BACKGROUND OF THE INVENTION

1. Field of the Invention

The present invention relates to an electronic book device, especially to an electronic book device integrated with a magnetic pen rack.

2. Description of the Related Art

As is known, a touch module, if placed over a display panel, has to be implemented with transparent materials like glass and ITO (Indium Tin Oxide), so as not to hinder the display of the display panel. However, if the display panel is an electrophoretic one—utilizing surrounding lighting for illumination, then the illumination attenuation caused by the touch module can still degrade the display brightness, even though the touch module is made of transparent materials. As a result, the electrophoretic display panel is placed in general over the touch module.

Besides, to avoid damaging the display panel, which overlies the touch module, in a touch input operation, a non-contact mechanism such as magnetic touch sensing mechanism is commonly utilized for the touch module. The magnetic touch sensing mechanism demands a digital input pen which is generally powered by rechargeable batteries. When the battery power of the digital input pen is exhausted, a charger is then needed to charge up the rechargeable batteries. However, using the charger to charge the rechargeable batteries inside the digital input pen has a disadvantage—the user has to carry the charger with him/her, otherwise the rechargeable batteries can not get charged. Besides, a common electronic book has a slim outline, and the thickness of a magnetic pen containing rechargeable batteries is generally no less than that of the electronic book. Therefore, the thickness of the electronic book has to be increased if a charger device is to be implemented in the electronic book to accommodate and charge the magnetic pen. In addition, if a connector for connecting and charging a magnetic pen is provided on a side wall of the electronic book, the appearance of the electronic book will be compromised, and a collision can cause the magnetic pen to fall out of the connection easily.

In addition to the problem of charging the magnetic pen, how to accommodate a LED (light emitting diode) light source module compactly and how to supply power to the LED light source module in a convenient way to provide lighting for the electronic book when ambient lighting is deficient, are also problems to be solved.

To solve the foregoing problems, the present invention proposes an electronic book device integrated with a magnetic pen rack, which not only can combine a magnetic pen and a LED light source module with an electronic book compactly, but also can make the magnetic pen and the LED light source module get the power supplied by the electronic book to perform charging and illumination respectively.

SUMMARY OF THE INVENTION

One objective of the present invention is to disclose an electronic book device integrated with a magnetic pen rack, which can combine a magnetic pen and a LED light source module with an electronic book compactly.

Another objective of the present invention is to disclose an electronic book device integrated with a magnetic pen rack, which can make a magnetic pen and a LED light source module get the power supplied by an electronic book to perform charging and illumination respectively.

To attain the foregoing objectives, an electronic book device integrated with a magnetic pen rack is proposed, the device including a leather cover, a rack, a magnetic pen, a LED light source module, and an electronic book.

The leather cover, of which the material can be leather, synthetic leather, or plastics, is used to cover the electronic book.

The rack, of which the material can be plastics, and of which the outline is rectangular with an opening at one side, is fixed on the leather cover so as to form a rectangular space to accommodate the electronic book. The rack includes: at least one bolt, used for fixing the electronic book; a first groove, used for accommodating the magnetic pen, the first groove having a first metal contact part to electrically connect the magnetic pen with the electronic book; and a second groove, used for accommodating the LED light source module, the second groove having a second metal contact part to electrically connect the LED light source module with the electronic book.

The magnetic pen has a metal contact part, used to connect electrically with the first metal contact part to access power for charging the magnetic pen when the magnetic pen is placed in the first groove.

The LED light source module has a metal contact part, used to connect electrically with the second metal contact part to access power for the lighting of the LED light source module when the LED light source module is placed in the second groove.

The electronic book has: at least one mounting hole, used for the at least one bolt to plug in; a first metal terminal part, used to connect electrically with the first metal contact part; and a second metal terminal part, used to connect electrically with the second metal contact part, wherein the electronic book provides power for charging the magnetic pen through the first metal terminal part, and power for the lighting of the LED light source module through the second metal terminal part.

To make it easier for our examiner to understand the objective of the invention, its structure, innovative features, and performance, we use a preferred embodiment, together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
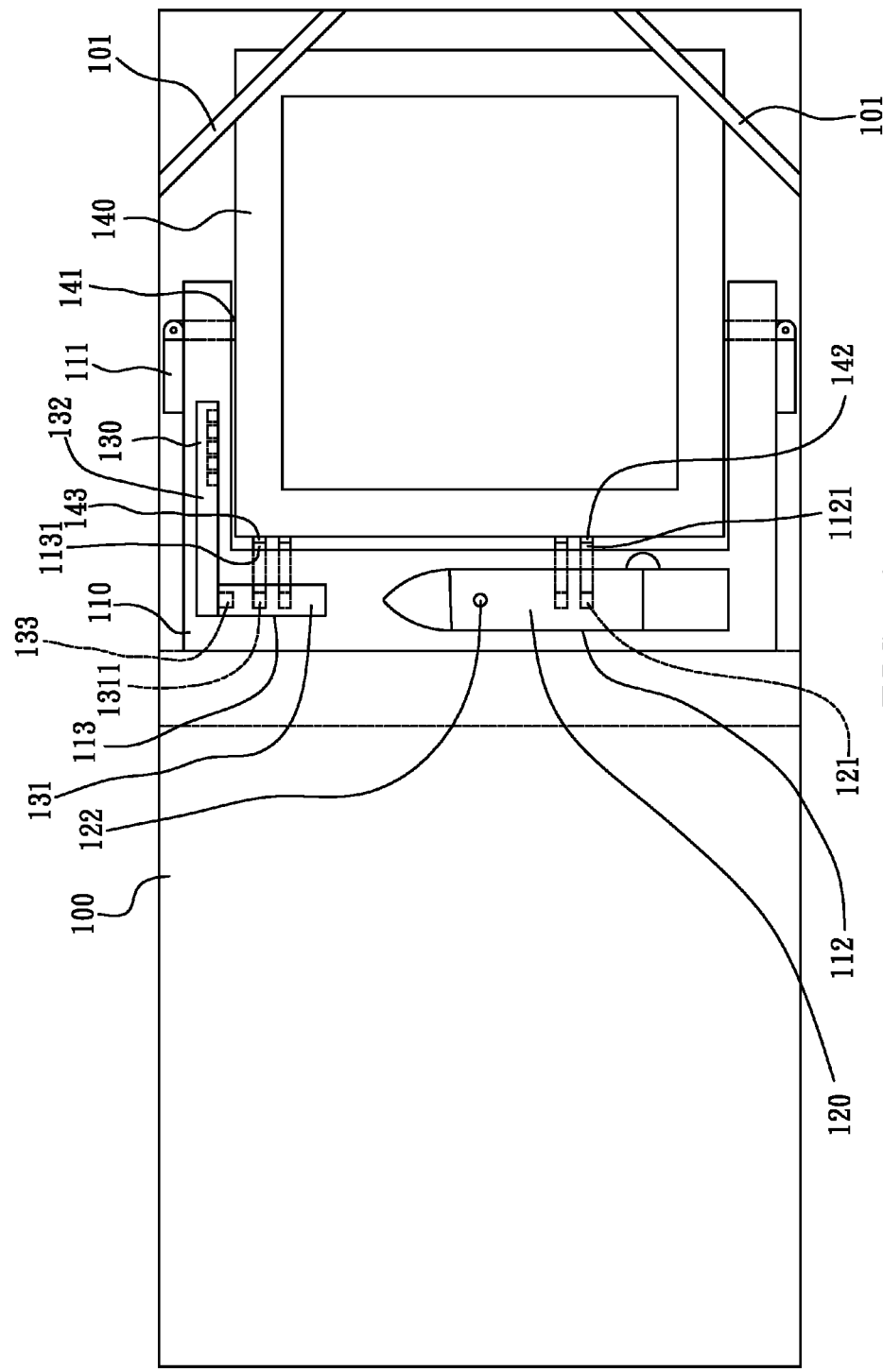
FIG. 1 illustrates a vertical view of an electronic book device integrated with a magnetic pen rack according to a preferred embodiment of the present invention.
Figure 2:
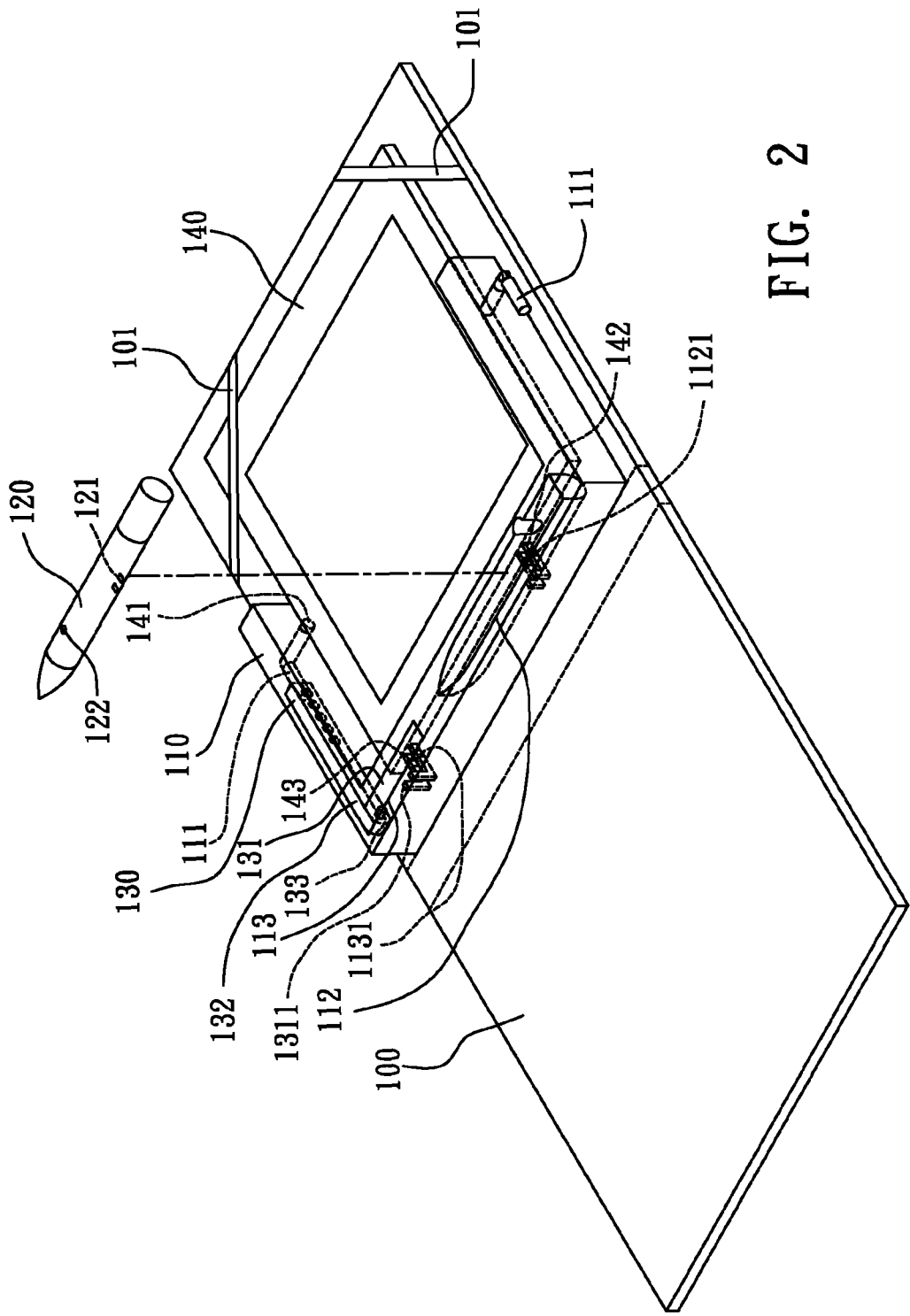
FIG. 2 illustrates an appearance perspective view of an electronic book device integrated with a magnetic pen rack according to a preferred embodiment of the present invention.

Please refer to FIG. 1 and FIG. 2, which illustrate respectively a vertical view and an appearance perspective view of an electronic book device integrated with a magnetic pen rack according to a preferred embodiment of the present invention. As illustrated in FIG. 1 and FIG. 2, the electronic book device integrated with a magnetic pen rack includes a leather cover 100, a rack 110, a magnetic pen 120, a LED light source module 130, and an electronic book 140.

The leather cover 100, of which the material can be leather, synthetic leather, or plastics, is used to cover the electronic book 140. Besides, the leather cover 100 has two straps 101 installed at two corners respectively to assist fixing the electronic book 140.

The rack 110, of which the material can be plastics, and of which the outline is rectangular with an opening at one side, is fixed on the leather cover 100 so as to form a rectangular space to accommodate the electronic book 140. The rack 110 includes: two bolts 111, used for fixing the electronic book 140, the bolt 111 preferably having a transverse handle to facilitate manual operation; a first groove 112, used for accommodating the magnetic pen 120, the first groove 112 having a first metal contact part 1121 to electrically connect the magnetic pen 120 with the electronic book 140; and a second groove 113, used for accommodating the LED light source module 130, the second groove 113 having a second metal contact part 1131 to electrically connect the LED light source module 130 with the electronic book 140.

The magnetic pen 120 has a third metal contact part 121, used for connecting electrically with the first metal contact part 1121 to access power supplied by the electronic book 140 to charge the magnetic pen 120 when the magnetic pen 120 is placed in the first groove 112; and a charging indication light 122, used to indicate the charging status of the magnetic pen 120.

The magnetic pen 120, used to provide touch input to a touch screen of the electronic book 140, is powered by a battery module inside the magnetic pen 120. The batteries of the battery module can be primary batteries, for example but not limited to alkaline batteries, or rechargeable batteries, for example but not limited to Ni—Cd batteries, Ni-MH batteries, Li-ion batteries, or Li-polymer batteries.

If the batteries of the battery module are primary batteries, then a replacement for the batteries is required when the battery power is exhausted; if the batteries of the battery module are rechargeable batteries, then a charging process is required for the rechargeable batteries when the battery power is exhausted. As a result, the magnetic pen 120 further includes a charger circuit, which is capable of utilizing the power supplied by the electronic book 140 to provide a charging process for the rechargeable batteries. The charging process can be a constant voltage charging process, a constant current charging process, a constant current constant voltage charging process, a pulse-wise charging process, or a Reflex charging process, wherein the constant current constant voltage charging process charges the battery module with a constant current for a first period and then with a constant voltage for a second period; the pulse-wise charging process uses repetitive charging current pulses instead of continuous constant charging current for the battery module; and the Reflex charging process adds a short discharging period after each of the repetitive charging current pulses for the battery module. The charger circuit can also output a charging status indicating signal to represent in-charging or fully-charged by detecting the voltage and/or current of the battery module.

The charging indication light 122, coupled to the charger circuit, is used for indicating the charging status of the magnetic pen 120 according to the charging status indicating signal, wherein the charging indication light 122 indicates in-charging/fully-charged with bright/dark, a first flickering frequency/a second flickering frequency, or a first color/a second color.

The LED module 130 includes: a base 131, having a fourth metal contact part 1311 for connecting electrically with the second metal contact part 1131 to access power for the lighting of the LED light source module 130 when the LED light source module 130 is placed in the second groove 113; a rotatable arm 132, having a LED light source; and a pivot 133, used to assembly the base 131 and the rotatable arm 132, so that the rotatable arm 132 can rotate relative to the base 131.

The electronic book 140 has: two mounting holes 141, used for the bolts 111 to plug in; a first metal terminal part 142, used for connecting electrically with the first metal contact part 1121 to supply power for charging the magnetic pen 120; a second metal terminal part 143, used for connecting electrically with the second metal contact part 1131 to supply power for the lighting of the LED light source module 130; a magnetic sensing touch module, used for detecting the touch input of the magnetic pen 120; and a display, which can be an electrophoretic display, a MEMS (Micro Electro Mechanical System) display, a cholesteric liquid crystal display, an electrowetting display, a liquid crystal display, an organic/inorganic electroluminescence display, or an electrochromic display.

Figure 3:
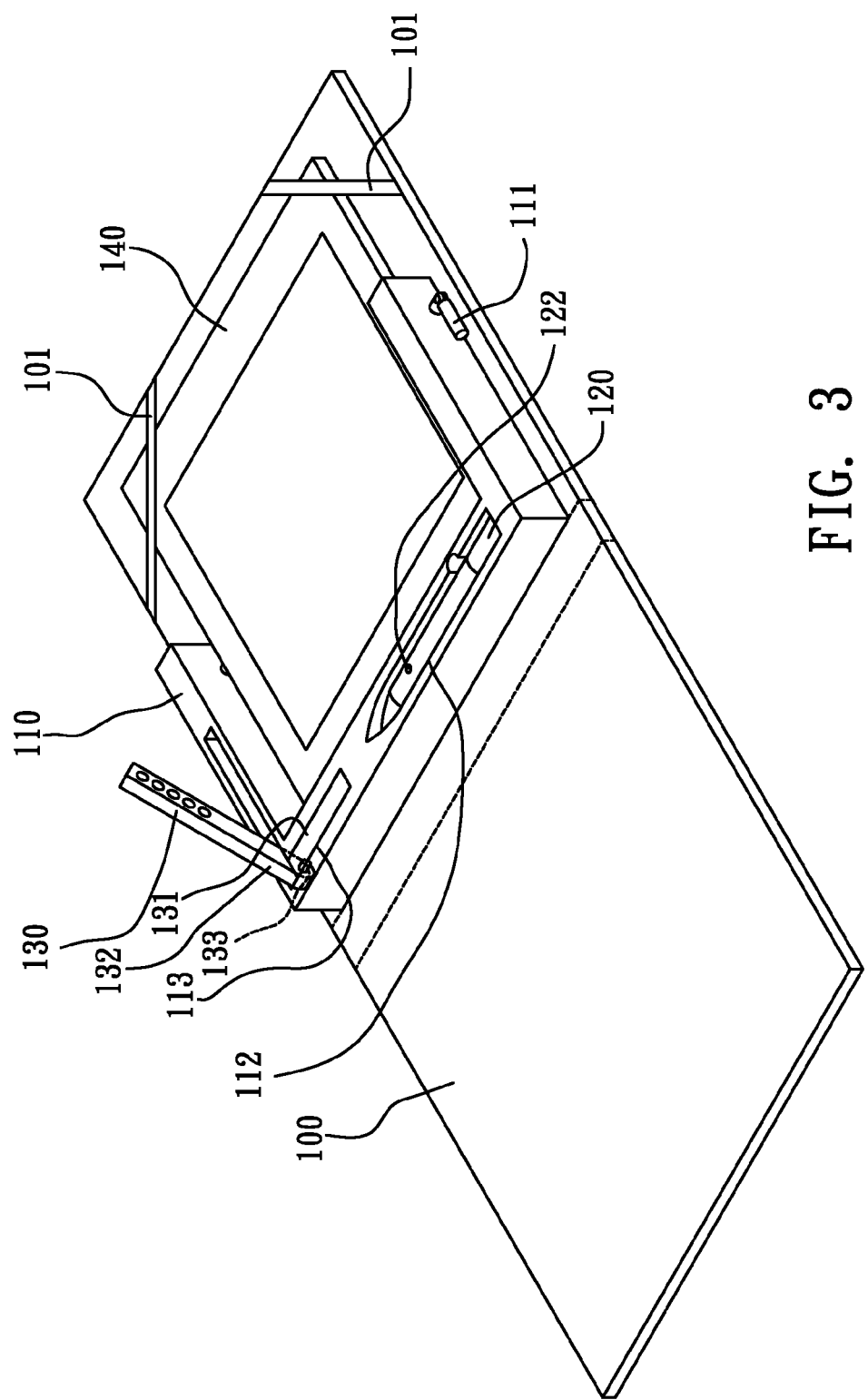
FIG. 3 is an illustrative view of the electronic book device of FIG. 2 with the LED light source module pulled upward.

When the ambient lighting is deficient, the rotatable arm 132 of the LED light source module 130 can be rotated upward so that the LED light source can provide lighting for the electronic book 140. Please refer to FIG. 3, which is an illustrative view of the electronic book device of FIG. 2 with the rotatable arm 132 of the LED light source module 130 pulled upward.

In conclusion, by using a rack to combine the magnetic pen and the LED light source module with the electronic book compactly without increasing the thickness of the electronic book, the novel design of the present invention not only can hold an electronic book firmly in a leather cover, but also can provide power for charging a magnetic pen and power for the lighting of a LED light source module. The present invention therefore does overcome the disadvantages of prior art electronic book devices.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. An electronic book device integrated with a magnetic pen rack, comprising:
   a leather cover;
   a rack, of rectangular outline, having an opening at one side, and being fixed on said leather cover so as to form a rectangular space, said rack comprising a first groove, a second groove, and at least one bolt, wherein said first groove comprises a first metal contact part, and said second groove comprises a second metal contact part;
   a magnetic pen, comprising a third metal contact part for connecting electrically with said first metal contact part when said magnetic pen is placed in said first groove;
   a LED light source module, comprising a fourth metal contact part for connecting electrically with said second metal contact part when said LED light source module is placed in said second groove; and an electronic book, comprising: at least one mounting hole, used for said at least one bolt to plug in; a first metal terminal part, used for connecting electrically with said first metal contact part; and a second metal terminal part, used for connecting electrically with said second metal contact part.

2. The electronic book device integrated with a magnetic pen rack as claim 1, wherein the material of said leather cover is selected from the group consisting of leather, synthetic leather, and plastics, and said leather cover comprises at least one strap for fixing said electronic book.

3. The electronic book device integrated with a magnetic pen rack as claim 1, wherein the material of said rack includes plastics.

4. The electronic book device integrated with a magnetic pen rack as claim 1, wherein said magnetic pen comprises at least one rechargeable battery.

5. The electronic book device integrated with a magnetic pen rack as claim 4, wherein said at least one rechargeable battery is selected from the group consisting of Ni—Cd battery, Ni-MH battery, Li-ion battery, and Li-polymer battery.

6. The electronic book device integrated with a magnetic pen rack as claim 4, wherein said magnetic pen further comprises a charger circuit to provide a charging process, which is selected from the group consisting of a constant voltage charging process, a constant current charging process, a constant current constant voltage charging process, a pulse-wise charging process, and a Reflex charging process.

7. The electronic book device integrated with a magnetic pen rack as claim 6, wherein said magnetic pen further comprises a charging indication light, coupled to said charger circuit to exhibit bright/dark, or a first flickering frequency/a second flickering frequency, or a first color/a second color for the status of in-charging/fully-charged according to a charging status indicating signal.

8. The electronic book device integrated with a magnetic pen rack as claim 1, wherein said LED light source module further comprises:
    a base, comprising said fourth metal contact part;
    a rotatable arm, comprising at least one LED light source; and
    a pivot, used to assembly said base and said rotatable arm, so that said rotatable arm can rotate relative to said base.

9. The electronic book device integrated with a magnetic pen rack as claim 1, wherein said electronic book comprises a magnetic sensing touch module and a display.

10. The electronic book device integrated with a magnetic pen rack as claim 9, wherein said display is selected from the group consisting of an electrophoretic display, a MEMS (Micro Electro Mechanical System) display, a cholesteric liquid crystal display, an electrowetting display, a liquid crystal display, an organic electroluminescence display, an inorganic electroluminescence display, and an electrochromic display.

* * * * *